Figure 24:
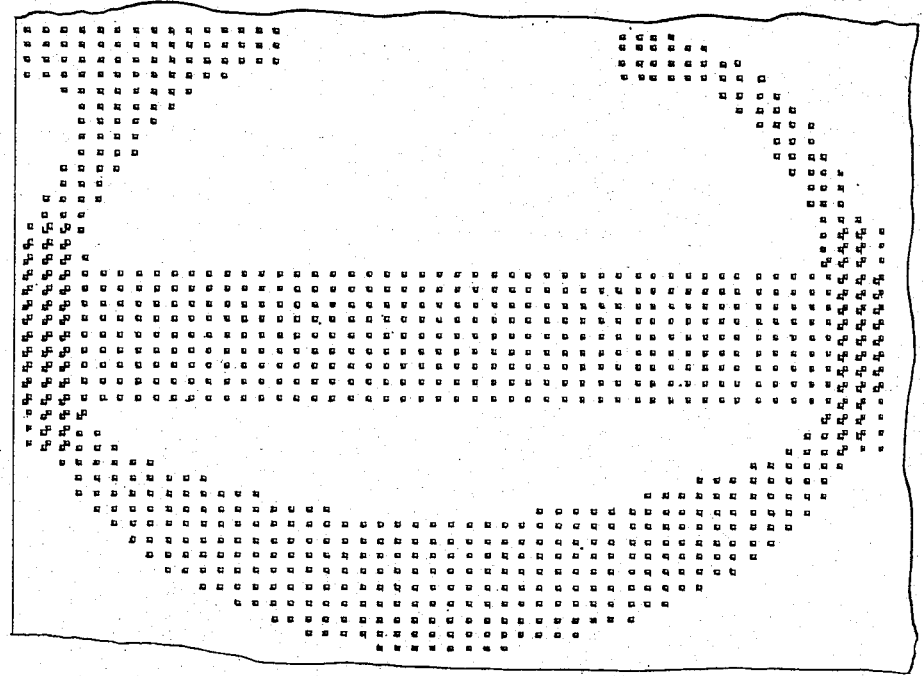

W. L. HILDBURGH.
ADVERTISING MACHINERY.
APPLICATION FILED OCT. 23, 1909.
1,172,455.
Patented Feb. 22, 1916.
5 SHEETS—SHEET 1.
Fig. 1ª
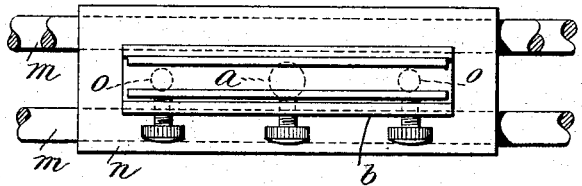
Fig. 2ª
Fig. 22.   Fig. 2ᵇ
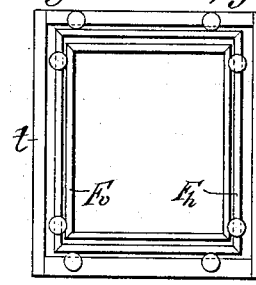 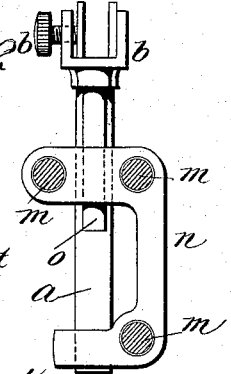 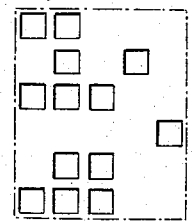
Fig. 1ᶜ
Fig. 3   Fig. 4   Fig. 6
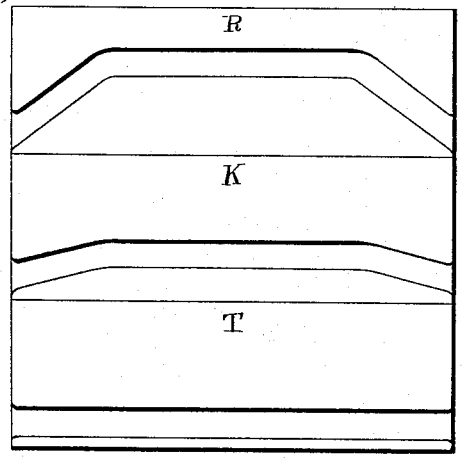 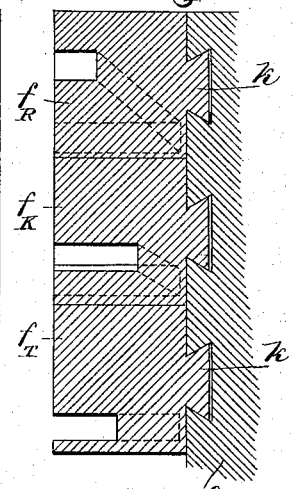 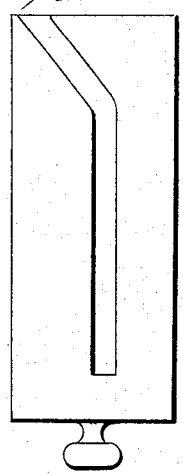
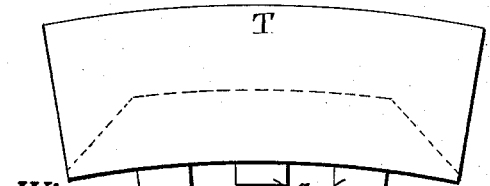
Fig. 5
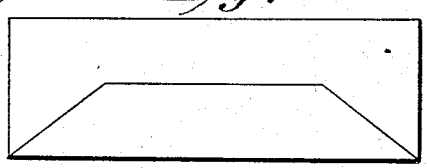
Fig. 7
Witnesses:
Jas. F. Coleman
John L. Latsch
Inventor
Walter L. Hildburgh
By Dyer & Dyer
Attorneys.

W. L. HILDBURGH.
ADVERTISING MACHINERY.
APPLICATION FILED OCT. 23, 1909.
1,172,455.
Patented Feb. 22, 1916.
5 SHEETS—SHEET 2.
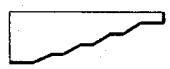
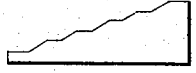
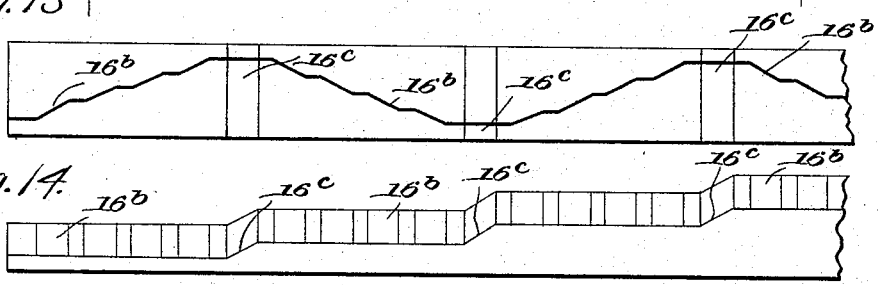
Witnesses:
Jas. F. Coleman
John L. Lotsch
Inventor
Walter Leo Hildburgh
By Dyer & Dyer
Attorneys.
THE COLUMBIA PLANOGRAPH CO., WASHINGTON, D. C.

W. L. HILDBURGH.
ADVERTISING MACHINERY.
APPLICATION FILED OCT. 23, 1909.
1,172,455.
Patented Feb. 22, 1916.
5 SHEETS—SHEET 3.
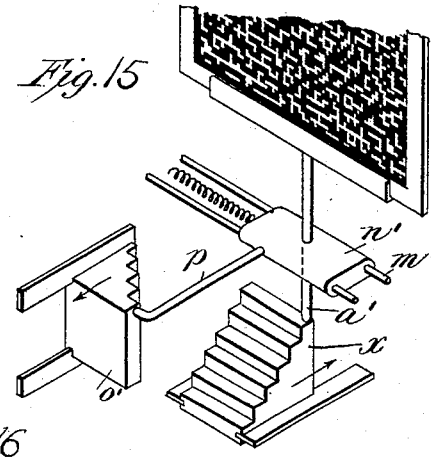
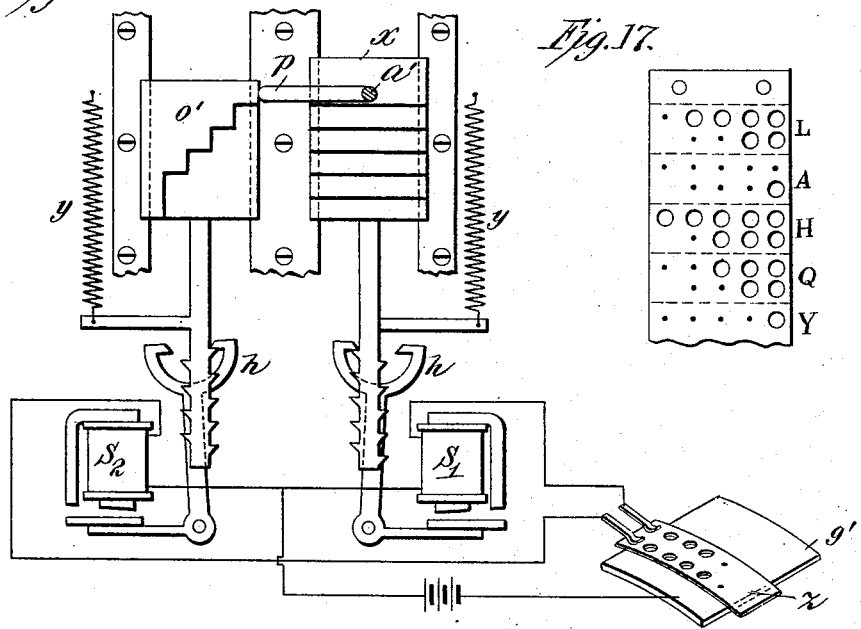
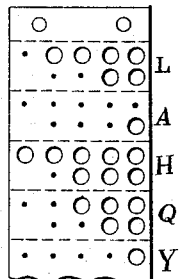
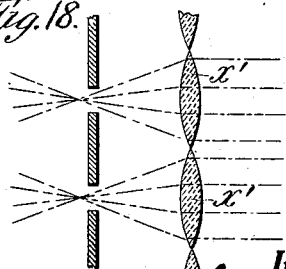
Witnesses:
Jas. F. Coleman
John L. Lotsch
Inventor
Walter Leo Hildburgh
By Dyer & Dyer
Attorneys.

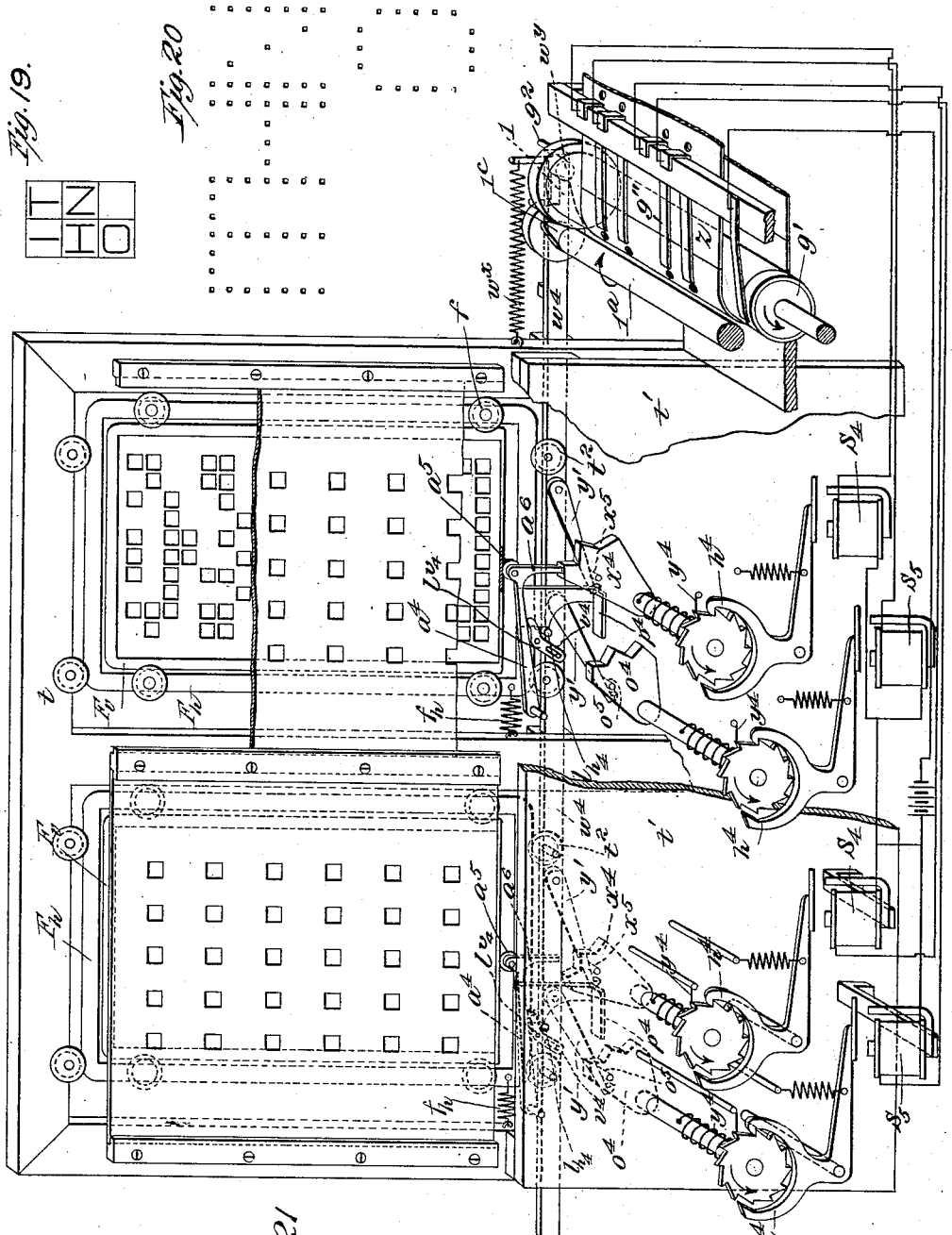

UNITED STATES PATENT OFFICE.

WALTER LEO HILDBURGH, OF WESTMINSTER, LONDON, ENGLAND.

ADVERTISING MACHINERY.

1,172,455.  Specification of Letters Patent.  Patented Feb. 22, 1916.

Application filed October 23, 1909. Serial No. 524,165.

*To all whom it may concern:*

Be it known that I, WALTER LEO HILDBURGH, a citizen of the United States of America, and residing at St. Ermins Hotel, Westminster, London, in the county of Middlesex, England, have invented a certain new and useful Improvement in Advertising Machinery, of which the following is a specification.

My invention relates to improvements in devices for producing changes in designs for advertising or other purposes and is especially applicable to devices in which a plurality of relatively movable plates is employed. One of said plates is provided with visual openings equally spaced in parallel lines and the other plate is provided with visual areas so arranged that, by the relative movement of the plates, some of the areas of the second plate will be brought into coincidence with some of the openings in the first plate and produce a desired image.

The present invention comprises a plate having regularly disposed visual areas, a second suitably designed marked plate and mechanism for imparting intermittent movement to the plates relatively to each other according to a controllable and predetermined plan.

The object of my invention is to produce a device for giving the required relative movement to the plates, such a device being automatic in its movements inasmuch as it will continue to exhibit the different designs in their regular order as long as the apparatus is in operation. This and further objects will appear from the embodiment of my invention set forth in the following specification and accompanying drawings considered together or separately. I attain these objects by the mechanism illustrated in the accompanying drawings, in which the same reference characters indicate similar parts in all the figures and in which—

Figure 23:
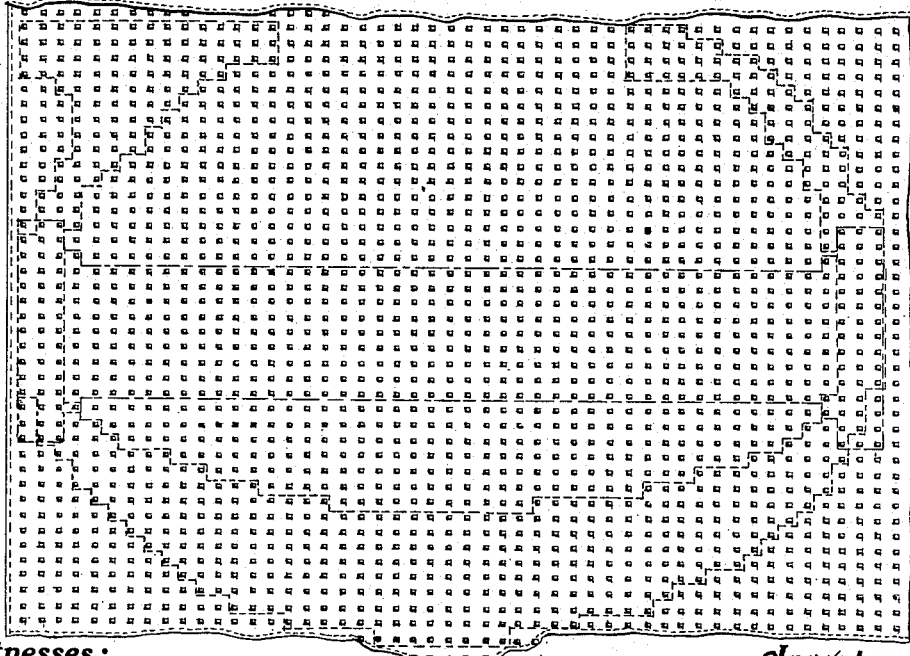

Figure 1$^a$ is a diagram showing the positions of the blocks for presenting thirty independent designs when used in conjunction with a suitable opaque plate. Fig. 1$^c$ is a view showing the visual areas in a unit area of the marked plate. Fig. 2$^a$ is a plan view of a device for changing the position of the movable plate. Fig. 2$^b$ is an end elevation of the same. Fig. 3 is a plan view of a portion of a cylinder provided with grooves for operating the movable plate. Fig. 4 is a sectional view of the same. Fig. 5 is a side view of Fig. 3. Fig. 6 is a plan view of a device for operating the apparatus by hand. Fig. 7 is a plan view of a modification of a portion of the device shown in Fig. 3. Figs. 8, 9, 10 and 11 show further modifications of the same. Fig. 12 is a longitudinal section of a number of elements such as those shown in Figs. 3 and 4. Fig. 13 is a plan view of a structure having a large number of elements such as are shown in Fig. 7. Fig. 14 is a side elevation of the same. Fig. 15 is a diagrammatic view of a device for moving a frame in a plurality of directions. Fig. 16 is a plan view of a device similar to that shown in Fig. 15, but provided with electrical operating means. Fig. 17 is a view of a perforated card for controlling the electrical impulses for operating a series of pairs of escapements, as shown in Fig. 16. Fig. 18 is a view showing an arrangement of lenses for concentrating the illumination on the openings of the opaque plate. Fig. 19 is a diagram of the allotment of the divisions of each unit of a movable plate displaying the characters I, T, H, N, O and vacancy. Fig. 20 shows the forms of the letters as they will appear to the observer in front of the fixed plate. Fig. 21 is a diagrammatic view of the preferred form of the entire apparatus. Fig. 22 is a diagrammatic view showing a set of frames and rollers for guiding the movable plate along two lines perpendicular to each other. Fig. 23 is an elevation of a portion of a stationary plate. Fig. 24 is a similar view of a portion of a movable plate.

In this specification, I shall refer, without limiting myself to the conditions implied by those terms, to the plate having the regularly disposed openings as the stationary plate and the other plate as the movable plate. I shall, for convenience of reference, describe herein a pair of plates capable of showing the letters of the English alphabet, a hyphen (-), an apostrophe ('), the character "and" (&) and vacancy and having these thirty designs arranged in the order shown in Fig. 1$^a$.

The mechanism described herein may be divided into two classes; one in which the movable plate is raised above the level required and is allowed to descend and come to rest at that level, and the other in which the plate is raised to the level required and exhibited. The movable plate for a thirty design pair of plates may be divided into a number of rectangular units corresponding in size with those into which the stationary plate may be divided. In these units, 1/30 part, similarly placed in each, is devoted to the areas required for the presentation of some one design. Fig. 1$^a$ is a diagram showing the allotment of the thirty parts of each unit of the movable plate, the first space representing vacancy, and the following spaces the various letters and punctuation marks selected for presentation. When any visual area in the movable plate is opposite an opening in the stationary plate, the design composed of the areas of the series which is represented by that area will appear through the stationary plate. If we assume that the width of a unit is .5 inch and its depth .6 inch, each division of that unit will be .1x.1 inch, and a movement of the movable plate each .1 inch, either horizontally or vertically, will cause the areas of a different series of divisions to be opposite the openings of the stationary plate and a different design to appear.

As shown in Figs. 1$^c$ and 21 the openings in the plates are smaller than the divisions of the unit area and, therefore, the dimensions of the openings, in the direction of the movement of the plate, will be smaller than the extent of one step of said movement in that direction. By making the openings smaller than the divisions of the unit area, there will always be a strip of opaque material between openings, thereby preventing leakage of light. I shall first refer to mechanism for raising the movable plate to the height required to exhibit a design. This may be accomplished by a manual operation, as by operating by hand the apparatus shown in Figs. 2$^a$ and 2$^b$, but it is preferably accomplished by having the ball bearing $q$ at the lower end of the rod $a$ of Fig. 2$^b$ rest on a moving device having high and low parts. As the device is moved to bring a high part under the rod, the frame carrying the plate will be elevated the required height. Various forms of such a device are shown in the drawings.

In the embodiment shown in Figs. 2$^a$ and 2$^b$, I provide a clamp $b$ in which the plate may be secured. The clamp is provided with a vertical rod $a$ and two vertical guide pins $o$—$o$. The vertical members are guided in a carriage $n$, which may be slid along horizontal rods $m$—$m$—$m$. In the manual operation of the device, the rod may be grasped by the hand and the carriage moved along the rods $m$ to a predetermined point. The rod $a$ may now be raised the required distance and the design will appear.

Figs. 21 and 22 show another method of guiding the movable plate. The movable plate is carried in a vertically movable frame $F_v$, which is held in alinement and guided in its movements by rollers carried on a horizontally movable frame $F_h$, which in turn is supported and guided in its movements by rollers carried by a stationary frame $t$ which may support the stationary plate.

In a simple form of the apparatus, the movable device comprises an element having a plurality of levels. When the rod $a$ rests upon the lower level, the movable plate will be in its lowest position, and when the end of the rod is raised, by the movement of the element, the plate will be raised to the required position. The element supporting the end of the rod is stepped horizontally so that, in addition to raising the rod, and with it the movable plate, it will also move the plate the required distance horizontally. It will be understood that a separate element is used to secure each design exhibited, and when a series of designs is to be shown in succession, a series of elements is employed to pass in the desired order beneath the end of the rod. In Fig. 12, I show a series of such elements in section with the rod $a$ in a lowered position at the right and a second rod on a higher level at the left.

In Fig. 3 I show a plan view of elements used to exhibit the characters R. K and T. In Fig. 5 I show a side view of the element for showing the letter "T." In Figs. 8 and 9 I show, in plan and side views, an element for transmitting horizontal movements to the rod $a$, and in Figs. 10 and 11 plan and side views of an element to give the vertical movements. In Figs. 13 and 14 I show a plan and a side view of a single element for giving both movements of the rod. In Figs. 3, 4 and 5 I show the elements carried on the surface of a cylinder, to which they are secured by means of dovetails $k$.

The movements of the movable plate may be controlled by hand instead of mechanically, as described above, and when this is done, I may use an element such as is shown in Fig. 6 sliding into place beneath the end of the rod $a$. In this form of the apparatus, there is a single element capable of giving to the rod $a$ the positions necessary for presenting a design and the element is moved in the direction of its length.

The devices above described are of what I term the "simple" type, as distinguished from the "multiple" type, which will be hereinafter described. The "simple" type of apparatus may be used in various situations; it may, for example, be used with relatively movable plates bearing advertising inscriptions for window or other displays, or it may be used with single letters to be presented in succession and thus forming words, or with single words presented in succession and thus forming sentences for the same purpose; or it may be used in theaters or other places to announce to the spectators the numbers or names of performances, performers or competitors, as a carriage call or any other signaling purposes.

In the foregoing description, it has been assumed that the relative movements of the plates have been controlled by the direct mechanical action of the controlling mechanism, but it is obvious that the connection between the rod $a$ and the frame carrying the movable plate may be replaced by some other form of connection without departing from the spirit or scope of my invention.

As described, the plate operating devices may be controlled by hand or by means of a suitable cylinder, but I prefer, in general, to control the positions by means of an electromagnetic system such as I will now proceed to describe.

Referring now to the preferred embodiment of the invention wherein the plate is raised above the required level at each operation of the device and allowed to descend and come to rest at the required level to give the proper showing of the design, attention is directed to Fig. 15, wherein $a'$ represents the rod carrying the movable plate, and $n'$ the carriage mounted on guides $m'$. Engaging the lower end of the rod is an element $x$, comprising a series of steps. This element, when moved in the direction of the arrow, will allow the rod and plate to drop successively from one step to the next lower. Projecting laterally from the carriage $m'$ is a finger $p$, provided with a bent extremity. This finger engages a stepped element $o'$. When the element is moved in the direction of the arrow, the spring attached to the carriage will draw the latter to the left, so that the finger $p$ will successively move from the top to the bottom step of the element, thereby giving the plate a step-by-step movement in that direction. The steps of the elements $o'$ and $x$ are each exactly equal in height to the horizontal and vertical movements of the plate, and if the plates be correctly adjusted with respect to the lower end of the rod $a'$, each movement of the element $o'$ will allow the plate to move to correspond to a horizontal line of designs—for example, E, F. G. H. I or T, U, V, W, X (see Fig. 1ª), and each movement of the element $x$ will allow the plate to move vertically to a distance to correspond with a vertical line of designs, as A, F, K, P, U, Z or C, H, M, R, W. It will be seen that instead of the elements $o'$ and $x$, the elements shown in Figs. 8 and 9 may be used to impart horizontal movement to the rod, and that shown in Figs. 10 and 11 to move it vertically, or the structure shown in Figs. 13 and 14 may be used to move the rod both vertically and horizontally.

Referring to Fig. 16, it will be seen that each of the elements $o'$ and $x$ is attached to a spring $y$, which tends to move it so that the lowest step of each element comes beneath its corresponding rod. Against these pulls the elements are held by means of escapements $h$—$h$, but each will be set free for a movement forward, corresponding to one step each time that an impulse passes through its magnet $S_1$ or $S_2$.

It is evident that if the rods $a'$ and $p$ be at the tops of the two elements, and that if this position correspond to vacancy, if one impulse be sent through the magnet $S_1$, the rod $a'$ will fall until arrested by the next lower step and the design "E" will appear. If, on the other hand, an impulse be sent through the magnet $S_2$ instead, the rod $p$ will be pulled to the left by the carriage spring, and the design "A" will be shown. Again, if one impulse be sent through $S_1$ and one through $S_2$, "F" will be brought into position, or if three impulses be sent through $S_1$ and two through $S_2$, Q will show, and so on. For the purpose of securing these impulses, I prefer to use a perforated card or plate $z$, preferably of the form shown in Figs. 17 and 21, moving in unison with the driving mechanism, and through the perforations conducting brushes will make electrical contact with a cylinder $q'$ as the perforations pass beneath them. This card, as shown, corresponds to a portion of one line of designs and each pair of lines of perforations (or marks where holes may be punched) controls one movable plate; a portion of such a card corresponding to the design "M" upon one of such plates is shown at $z$ in Fig. 21. This card is shown as being formed of one piece, with the perforations punched therein. A number of such cards may be fastened together, along their broader edges, to form a more or less continuous strip.

In Fig. 21 I show diagrammatically the preferred embodiment of my invention. In this figure I have shown a frame $t$, in which are mounted two sets of stationary and movable plates, each set capable of exhibiting a plurality of designs. The stationary plates are carried directly by the frame $t$. The frame $t$ is provided at its top and bottom with rollers $t^2$, and these rollers guide the horizontal movements of frames $F_h$. Each of these frames $F_h$ carries a set of rollers $f$ which guide the vertical movements of a frame $F_v$, and to this frame is secured the movable plate. Each frame $F_h$ is provided with a spring $f_h$, and these springs are secured to the frame $t$ in such a manner as to resist movement of the frames $F_h$ to the right in the figure. To the lower rail $t'$ of the frame $t$ is pivoted a lever $a^4$ for each movable plate. Each lever is provided with a roller $a^5$, upon which rests the frame $F_h$, and with a downwardly extending arm $a_6$ which engages its corresponding rotatable block $x^4$. Mounted on the rail $t'$ is a lever $l_{v4}$ which engages the under side of the lever, $a^4$, and is provided with a slotted arm $v^4$. Mounted in the frame $t$ is a reciprocating bar $w^4$, and projecting from one side of the bar is a pin for engagement with the slot in the arm $v^4$. Each block $o^4$ and $x^4$ is provided with a laterally projecting pin $o^5$ and $x^5$, and these pins are adapted to be engaged by a hook $y'$ corresponding to each block, and pivotally carried by the bar $w^4$. Depending from each frame $F_h$ is a bracket provided at its lower end with a foot $p^4$, which is arranged in the path of the block $o^4$ and engages with a predetermined step on the block to arrest the movement of the frame to the left in the figure. Carried by the bar $w^4$ is a finger $l_{h4}$ for engagement with each bracket to move it to the right when the bar is reciprocated in that direction. The shaft of each block $o^4$ and $x^4$ is provided with a spring $y^4$ to turn the block in the direction opposed to the pull of the hooks $y'$ and the shafts are held against the tension of the springs by the escapements $h_4$. The escapements of the blocks $o^4$ and $x^4$ are controlled by electromagnets $S_5$ and $S_4$ respectively. The magnets are each arranged in circuit with a drum $g'$ and brushes $g''$ coöperating therewith. Passing over the drum is a series of perforated cards $z$ of insulating material. The perforations in the card correspond with one line of designs, and as a certain line of perforations passes beneath the brushes, contacts are made which send the proper impulses through the magnet $S_4$ to bring the proper steps of the block $x^4$ beneath the lever $a^4$ and arrest the downward movement of the plate at the predetermined point. At the same time, the proper impulses will be sent through the magnet $S_5$ to stop the movement of the plate to the left by the engagement of the foot $p^4$ with the proper step on the block $o^4$.

The drum may be rotated in the following manner: One end of the drum $g'$ is provided with a series of projecting pins $g^2$ arranged in the path of a finger $l^c$ carried by a continuously rotating shaft $l^a$. As the shaft rotates the finger $l^c$ will strike a pin $g^2$ and move the drum through the part of a revolution sufficient to feed a card under the brushes $g''$. Carried on one end of the shaft $l^a$ is a cam $l$ which, at each revolution of the shaft, will engage a roller $w^v$ on the bar $w^4$ and move the latter to the right. A spring $w^x$ attached to the bar and to the frame $t$ will move the bar $w^x$ to the left when the cam $l$ passes the roller.

The bar $w^4$ extends the entire width of the main frame of the apparatus, and at each rotation of the drum will move all of the movable plates to the full extent of their movements upward and to the right. As the plates descend by gravity, their descent will be arrested, at the predetermined points, by the stepped blocks $x^4$ and their movements to the left will be similarly stopped by the blocks $o^4$.

In practice I preferably arrange the plates with respect to an illuminating means, so that the rays of light will pass through the openings therein directly to the eyes of the observer, but when the number of openings of a combination in the stationary plate is small I may use lenses $x$, $x'$, as shown in Fig. 18, to concentrate the light on the apertures. These lenses will serve several purposes: first, to collect the light from a large area and cause it to pass through an aperture in the plate; and second, to cause the light to be distributed after it has passed through the aperture.

The operation of the embodiment illustrated in Fig. 21 is as follows: A card $z$, having been punched to permit of the proper contacts being made is secured to other cards perforated to admit of other combinations of contacts being made and the strip of cards thus produced is passed around the drum $g'$ and between it and the brushes, so that it will move at the same speed as the surface of the drum and allow the proper circuits to be made when the perforations come under the ends of the brushes and allow them to come in contact with the drum. The drum is provided with a commutator and brush, making a common return. The revolution of the shaft $l^a$ and the cam $l$, will reciprocate the bar $w^4$ against the tension of its spring. This movement of the bar will, through its engagement with the slotted ends $v^4$ of the lever $l_{v4}$, cause them to tilt the levers $a^4$, and through them raise the frames $F_v$ to the limit of their vertical movements. At the same time, the fingers $l_{h4}$ will engage the brackets $p^4$ on the frames $F_h$ and move them to the right, each against the tension of its spring $f_h$ and to the limit of its movement in that direction. This movement of the bar to the right will cause the hooks $y'$ to engage the pins $o^5$ and $x^5$ on the stepped plates $o^4$ and $x^4$ and rotate them against the tension of their springs $y^4$. The plates will now be in such a position that the openings are all masked and no light will pass through them. The finger $l^c$ on the shaft $l^a$ will engage successively with the pins $q^2$ on the arm $g'$ thereby turning the latter in the direction of the arrow and feeding the strip $z$. The revolution of the drum carrying the cards or strip $z$ with it will, when the brushes make contact with the surface thereof through the perforations in the strip, energize the magnets $S_4$ and $S_5$ once for each perforation, passing under the brush, and the energization and de-energization of the magnets will operate the escapements $h^4$ and permit the springs $y^4$ to rotate the stepped blocks with a step-by-step movement, one step for each perforation in the card through which the brush engages the drum and completes the circuit to its magnet. It will be understood that each magnet is wired in series with its own brush and with the commutator brush, and that there is a line of perforations or places where perforations may be placed traveling under each brush except the commutator brush.

When the bar has reached the limit of its movement to the right, its spring $w^x$ will move it to the left, and this movement will swing the levers $l_{v4}$ and withdraw the support from the frames $F_v$. By the same movement of the bar $w^4$, the fingers $l_{h4}$ will be moved from their engagement with the brackets $p^4$ and the frames $F_h$, and with them the frames $F_v$ will be moved to the left by means of their springs $f_h$. The stepped blocks $o^4$, having in the meanwhile been rotated a step for each perforation over which the brush for its magnet has passed, will be in position to arrest the spring actuated movement of the frame $F_h$ to the left by reason of the engagement of the brackets $p^4$ with the steps selected. The stepped blocks $x^4$ having been set in similar manner will intercept the ends of the levers $a^4$ and arrest the downward movement of the frames $F_v$. The selected perforations in the movable plates will come opposite corresponding openings in the stationary plates, and the desired design will appear. This operation will be repeated as long as the drum $g'$ is rotated.

It will be seen that for each reciprocation of the bar $w^4$ to the right, the springs $y'$ will be wound exactly the same amount as they were permitted to be unwound by the operation of the escapement.

In the embodiment of the invention illustrated, the specific arrangement of the means for moving the reciprocating bar $w^4$, the specific arrangement of the contact making devices and their relation to the cam, and the specific mounting of the escapement devices are merely illustrative and form no part of applicant's invention.

The improved plates hereinbefore disclosed are not claimed in this application, but form the subject matter of my application for patent Serial No. 519,597, filed September 25, 1909.

Having now described my invention, what I claim as new and desire to secure by Letters Patent, is:—

1. In a device of the character described, the combination with a pair of relatively movable superposed plates, one plate having equally spaced visual areas, the other plate having groups of similar visual areas, said groups being so arranged that by the relative shifting of the plates the groups of visual areas on the second plate may be successively caused to coöperate with the visual areas on the first plate to thereby produce a succession of predetermined images, means for moving one plate a distance approximately equal to the distance between areas in the first plate, means for returning said plate toward its normal position, and means for intercepting the return of the plate, said latter means permitting a step by step movement of said plate.

2. In a device of the character described, the combination with a pair of relatively movable superposed plates, one plate having equally spaced visual areas; the other plate having groups of similar visual areas, said groups being so arranged that by the relative shifting of the plates the groups of visual areas on the second plate may be successively caused to coöperate with the visual areas on the first plate to thereby produce a succession of predetermined images, a reciprocating member, and means carried thereby for moving one plate a distance approximately equal to the distance between areas on the first plate, means for returning said plate to its normal position, and rotatable devices for intercepting the return movement of the plate, said devices permitting a step-by-step movement of said plate.

3. In a device of the character described, the combination with a pair of relatively movable superposed plates, one plate having equally spaced visual areas, the other plate having groups of similar visual areas, said groups being so arranged that by the relative shifting of the plates the groups of visual areas on the second plate may be successively caused to coöperate with the visual areas on the first plate to thereby produce a succession of predetermined images, a reciprocating member, and means carried thereby for moving one plate in two directions perpendicular to each other for a distance in each direction approximately equal to the distance in that direction between areas on the first plate, means for permitting the return of said plate to its normal position, and a rotatable device for intercepting the return movement in each direction, said devices permitting a step-by-step movement of said plate.

4. In a device of the character described, the combination with a pair of relatively movable superposed plates, one plate having equally spaced visual areas, the other plate having groups of similar visual areas, said groups being so arranged that by the relative shifting of the plates the groups of visual areas on the second plate may be successively caused to coöperate with the visual areas on the first plate to thereby produce a succession of predetermined images, a reciprocating member, means carried thereby for moving one plate in two directions perpendicular to each other for a distance in each direction approximately equal to the distance in that direction between areas on the first plate, means for permitting the return of said plate to its normal position, a rotatable device for intercepting the return movement in each direction, said devices permitting a step-by-step movement of said plate, and means for intermittently moving the devices.

This specification signed and witnessed this 11th day of October, 1909.

WALTER LEO HILDBURGH.

Witnesses:
JNO. ALDRIDGE,
JAMES RUSSELL.

Copies of this patent may be obtained for five cents each, by addressing the "Commissioner of Patents, Washington, D. C."